United States Patent
Hammer et al.

(10) Patent No.: US 9,104,608 B2
(45) Date of Patent: Aug. 11, 2015

(54) FACILITATING COMPREHENSION IN COMMUNICATION SYSTEMS

(75) Inventors: Mette Friedel Margareta Hammer, Helsinki (FI); Ruthie D. Lyle, Durham, NC (US); Patrick Joseph O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/605,188

(22) Filed: Sep. 6, 2012

(65) Prior Publication Data

US 2014/0067101 A1  Mar. 6, 2014

(51) Int. Cl.
| | |
|---|---|
| *G06F 11/14* | (2006.01) |
| *H04L 1/18* | (2006.01) |
| *H04L 29/06* | (2006.01) |
| *H04M 7/00* | (2006.01) |
| *H04M 1/253* | (2006.01) |

(52) U.S. Cl.
CPC ........ *G06F 11/1402* (2013.01); *G06F 11/1446* (2013.01); *H04L 1/1806* (2013.01); *H04L 1/1816* (2013.01); *H04L 65/1083* (2013.01); *H04L 65/80* (2013.01); *H04M 7/006* (2013.01); *H04M 1/2535* (2013.01)

(58) Field of Classification Search
CPC ............ G06F 11/0793; G06F 11/1402; G06F 11/1146; H04L 1/1806; H04L 1/1816
USPC ............ 700/94; 704/270; 714/2, 3, 6, 16, 25, 714/45, 48, 49, 746, 747, 748, 750
See application file for complete search history.

(56) References Cited

U.S. PATENT DOCUMENTS

| | | | |
|---|---|---|---|
| 6,970,712 | B1 | 11/2005 | Vo |
| 7,869,579 | B2 | 1/2011 | Kwon |
| 7,885,519 | B2 | 2/2011 | Pawlowski |
| 8,547,880 | B2 * | 10/2013 | Yoakum et al. ............... 370/260 |
| 2004/0190700 | A1 | 9/2004 | Cutaia et al. |
| 2007/0133523 | A1 | 6/2007 | Kwon |
| 2007/0162169 | A1 * | 7/2007 | Watanuki ........................ 700/94 |
| 2009/0238541 | A1 | 9/2009 | Verna |
| 2010/0217414 | A1 * | 8/2010 | Sanders et al. ................. 700/94 |

OTHER PUBLICATIONS http://www.filebuz.com/findsoftware/Cat_Replay_Voice/1.html, Apr. 5, 2012; downloaded Aug. 31, 2012, pp. 1-4.

* cited by examiner

*Primary Examiner* — Jesse Elbin
(74) *Attorney, Agent, or Firm* — Holland & Knight LLP; Brian J. Colandreo, Esq.; Jeffrey T. Placker, Esq.

(57) ABSTRACT

A method, computer program product, and computer system for receiving information from a first computing device, the information including digital audio data, the information sent to a second computing device by the first computing device. The information is received from the second computing device. A discrepancy between at least a portion of the information received from the first computing device and at least a portion of the information received from the second computing device is identified in real-time. At least a portion of the discrepancy is corrected in real-time for replaying at least the portion of the discrepancy at the second computing device.

21 Claims, 10 Drawing Sheets

FACILITATING COMPREHENSION IN COMMUNICATION SYSTEMS

TECHNICAL FIELD

This disclosure relates to communication systems.

BACKGROUND

An issue that may arise, e.g., in the field of unified telephony and IP telephony, is the lack or loss of sound (e.g., speech) quality when communicating between two or more users. The lack of quality may be the result of numerous circumstances, such as, latency, packet loss, noise, hardware and software quality issues, user listening effort, user accents, and user expectations. In example situations where audio information that is crucial for the understanding of the remainder of a conversation is lost or misheard, a lack of quality at any point during the conversation may be detrimental.

SUMMARY OF DISCLOSURE

In one implementation, a method, performed by one or more computing devices, comprises receiving information from a first computing device, the information including digital audio data, the information sent to a second computing device by the first computing device. The information is received from the second computing device. A discrepancy between at least a portion of the information sent by the first computing device and at least a portion of the information received from the second computing device is identified in real-time. At least a portion of the discrepancy is corrected in real-time for replaying at least the portion of the discrepancy at the second computing device.

One or more of the following features may be included. Identifying in real-time the discrepancy may include comparing at least the portion of the information sent by the first computing device with at least the portion of the information received from the second computing device. Identifying in real-time the discrepancy may include identifying in real-time the discrepancy based upon, at least in part, one or more received user options. Correcting in real-time at least the portion of the discrepancy may include sending, to the second computing device, a replayable file that includes at least the portion of the discrepancy. Correcting in real-time at least the portion of the discrepancy may include correcting in real-time at least the portion of the discrepancy based upon, at least in part, one or more received user options. A determination may be made that at least the portion of the information from a user is received at the second computing device. An identification of the user and a time when at least the portion of the information is received from the user may be displayed in response to the determination. Correcting in real-time at least the portion of the discrepancy may include receiving a selection of the displayed identification of the user.

In another implementation, a computer program product resides on a computer readable storage medium that has a plurality of instructions stored on it. When executed by a processor, the instructions cause the processor to perform operations comprising receiving information from a first computing device, the information including digital audio data, the information sent to a second computing device by the first computing device. The information is received from the second computing device. A discrepancy between at least a portion of the information sent by the first computing device and at least a portion of the information received from the second computing device is identified in real-time. At least a portion of the discrepancy is corrected in real-time for replaying at least the portion of the discrepancy at the second computing device.

One or more of the following features may be included. Identifying in real-time the discrepancy may include comparing at least the portion of the information sent by the first computing device with at least the portion of the information received from the second computing device. Identifying in real-time the discrepancy may include identifying in real-time the discrepancy based upon, at least in part, one or more received user options. Correcting in real-time at least the portion of the discrepancy may include sending, to the second computing device, a replayable file that includes at least the portion of the discrepancy. Correcting in real-time at least the portion of the discrepancy may include correcting in real-time at least the portion of the discrepancy based upon, at least in part, one or more received user options. Instructions may further be included for determining that at least the portion of the information from a user is received at the second computing device. Instructions may further be included for identifying the user and a time when at least the portion of the information is received from the user may be displayed in response to the determination. Correcting in real-time at least the portion of the discrepancy may include receiving a selection of the displayed identification of the user.

In another implementation, a computing system includes a processor and a memory configured to perform operations comprising receiving information from a first computing device, the information including digital audio data, the information sent to a second computing device by the first computing device. The information is received from the second computing device. A discrepancy between at least a portion of the information sent by the first computing device and at least a portion of the information received from the second computing device is identified in real-time. At least a portion of the discrepancy is corrected in real-time for replaying at least the portion of the discrepancy at the second computing device.

One or more of the following features may be included. Identifying in real-time the discrepancy may include comparing at least the portion of the information sent by the first computing device with at least the portion of the information received from the second computing device. Identifying in real-time the discrepancy may include identifying in real-time the discrepancy based upon, at least in part, one or more received user options. Correcting in real-time at least the portion of the discrepancy may include sending, to the second computing device, a replayable file that includes at least the portion of the discrepancy. Correcting in real-time at least the portion of the discrepancy may include correcting in real-time at least the portion of the discrepancy based upon, at least in part, one or more received user options. Instructions may further be included for determining that at least the portion of the information from a user is received at the second computing device. Instructions may further be included fore identifying the user and a time when at least the portion of the information is received from the user may be displayed in response to the determination. Correcting in real-time at least the portion of the discrepancy may include receiving a selection of the displayed identification of the user.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

System Overview

Figure 1:
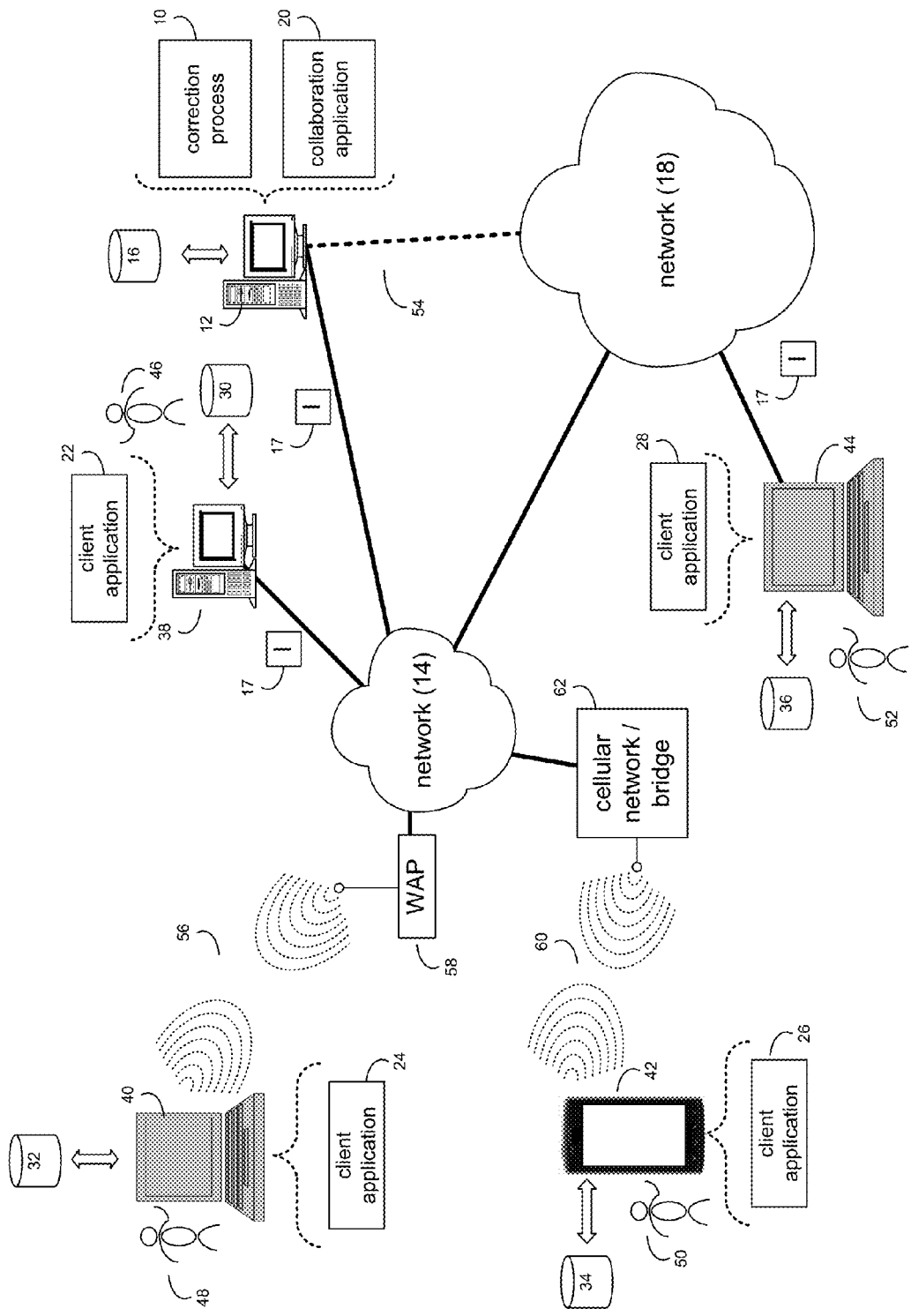
FIG. 1 is an illustrative diagrammatic view of a correction process coupled to a distributed computing network according to one or more embodiments of the present disclosure.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. Te computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various embodiments of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown correction process 10 that may reside on and may be executed by a computer (e.g., client computer 12), which may be connected to a network (e.g., network 14) (e.g., the internet or a local area network). Examples of client computer 12 may include, but are not limited to, a personal computer(s), a laptop computer(s), mobile computing device(s), a (e.g., central) server computer, a series of server computers, a mainframe computer(s), or a computing cloud(s). Client computer 12 may execute an operating system, for example, but not limited to Microsoft® Windows®; Mac® OS X®; Red Hat®; Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, correction process 10 may receive information (e.g., information 17) from a first computing device. The information may include digital audio data (or video data, other types of data, or combination thereof) that may be sent to a second computing device by, e.g., the first computing device. The information may be received, e.g., by correction process 10 from the second computing device. A discrepancy between at least a portion of the information sent by the first computing device and at least a portion of the information received from the second computing device may be identified in "real-time" (e.g., which as can be appreciated by those skilled in the art may include near (or substantially near) real-time with some contemplated degree of delay, due to, e.g., latency or network/device induced delay, intentional delay for design purposes, etc.). At least a portion of the discrepancy may be corrected in real-time for replaying at least the portion of the discrepancy at the second computing device.

The instruction sets and subroutines of correction process 10, which may be stored on storage device 16 coupled to client computer 12, may be executed by one or more processors (not shown) and one or more memory architectures (not shown) included within client computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Client computer 12 may execute a collaboration application (e.g., collaboration application 20), examples of which may include, but are not limited to, e.g., a web conferencing application, a video conferencing application, a voice-over-IP application, or other application and/or digital voice system application that allows for virtual meeting and/or remote collaboration (e.g., through a central server or otherwise). Correction process 10 and/or collaboration application 20 may be accessed via client applications 22, 24, 26, 28. Correction process 10 may be a stand alone application, or may be an applet/application/script that may interact with and/or be executed within collaboration application 20. Examples of client applications 22, 24, 26, 28 may include but are not limited to a web conferencing application, video conferencing application, voice-over-IP application, or other application that allow for virtual meeting and/or remote collaboration, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (e.g., smart television) (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of correction process 10 (and vice versa). Accordingly, correction process 10 may be a purely server-side application, a purely client-side application, or a hybrid server-side/client-side application that is cooperatively executed by one or more of client applications 22, 24, 26, 28 and correction process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and collaboration application 20.

Users 46, 48, 50, 52 may access client computer 12 and correction process 10 directly through network 14 or through secondary network 18. Further, client computer 12 may be connected to network 14 through secondary network 18, as illustrated with phantom link line 54. Correction process 10 may include one or more user interfaces, such as browsers and textual or graphical user interfaces, through which users 46, 48, 50, 52 may access correction process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
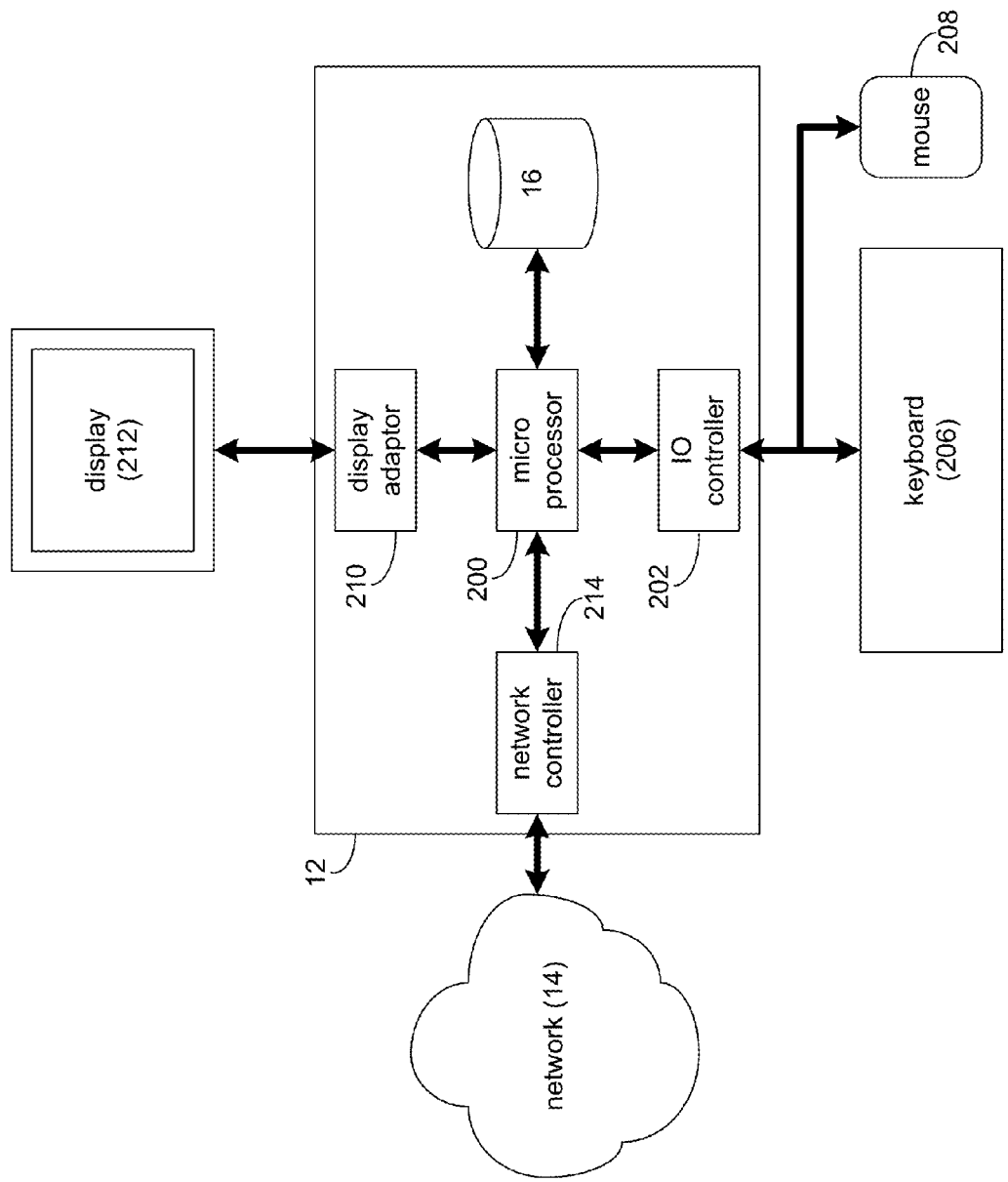
FIG. 2 is a diagrammatic view of the client computer of FIG. 1 according to one or more embodiments of the present disclosure.
Figure 3:
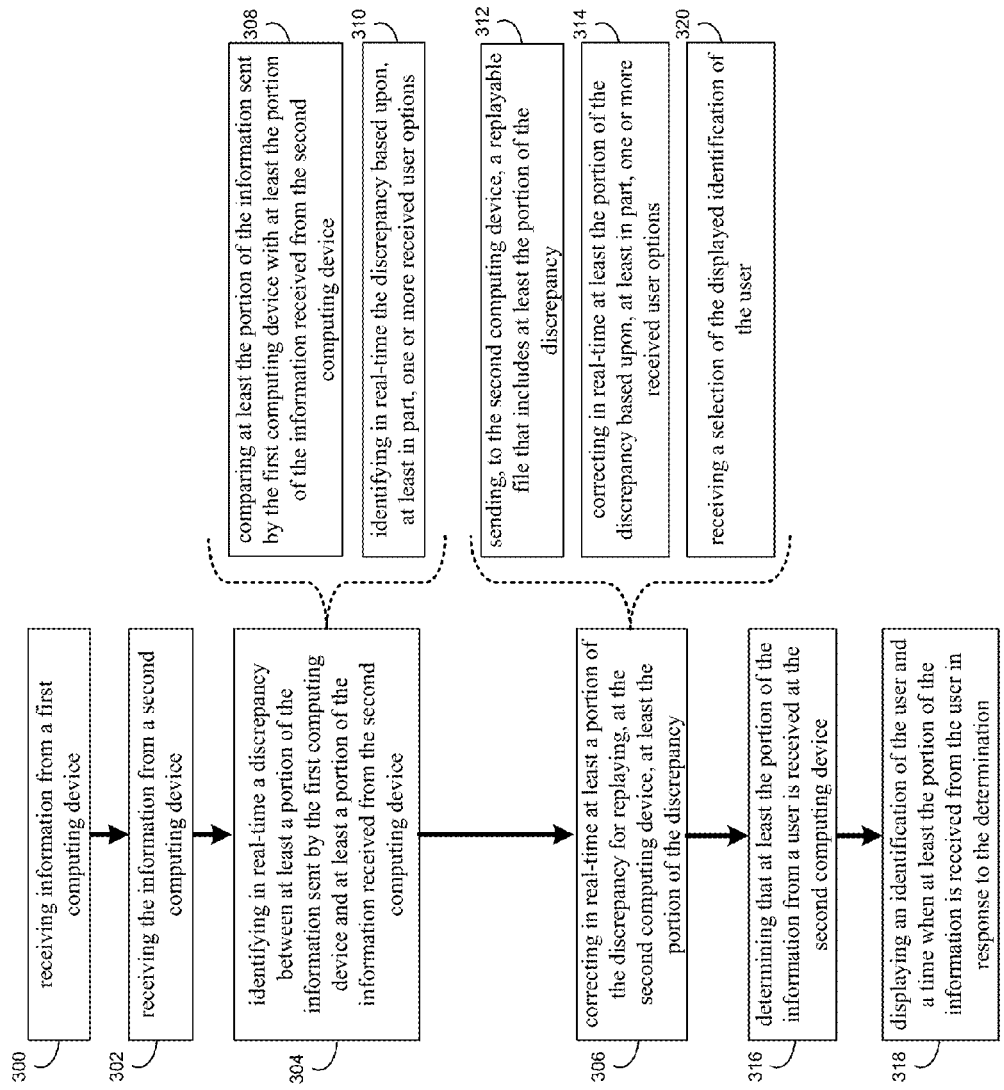
FIG. 3 is an illustrative flowchart of the correction process of FIG. 1 according to one or more embodiments of the present disclosure.
Figure 4:
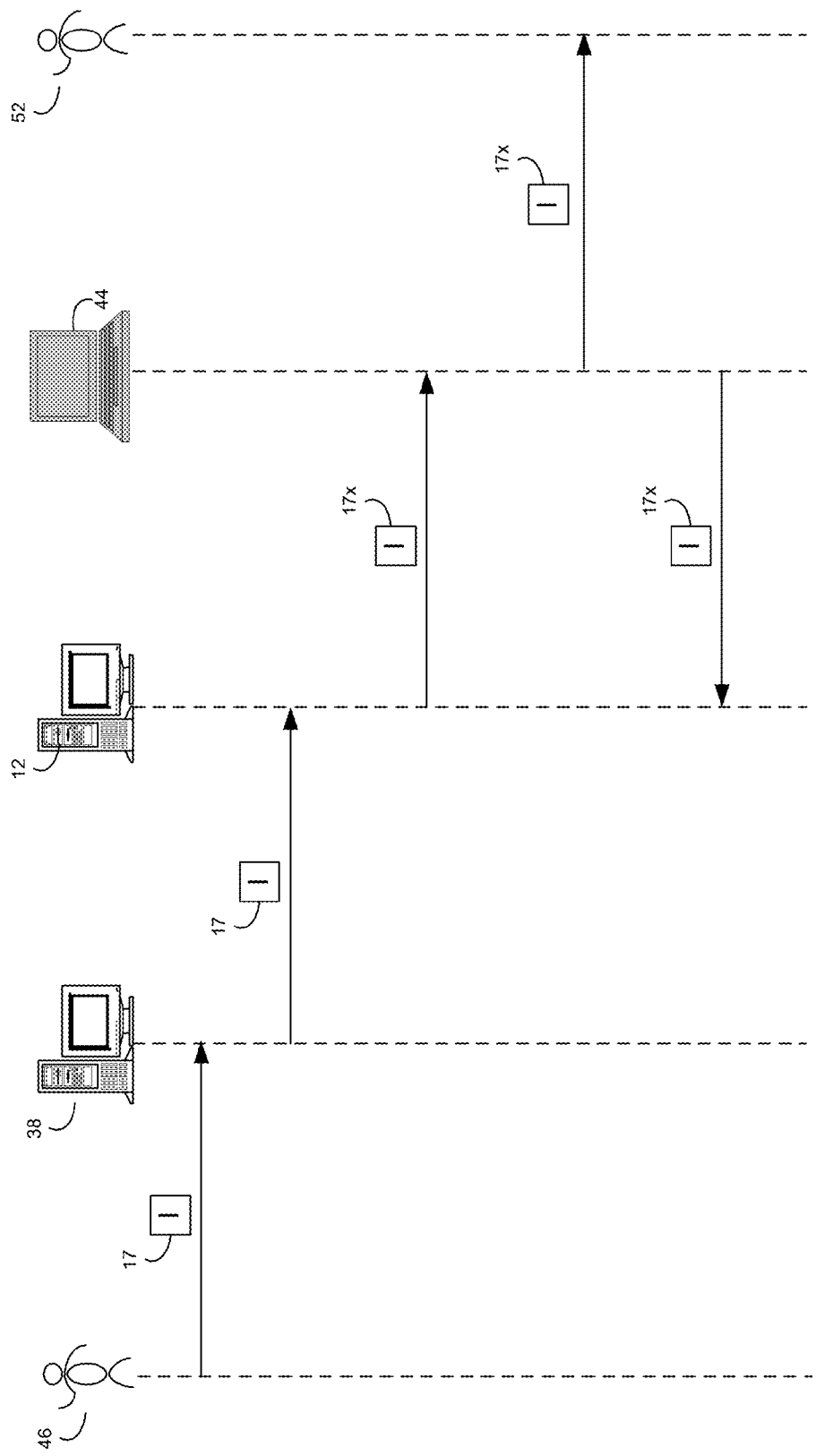
FIG. 4 is an illustrative flowchart for sending information according to one or more embodiments of the present disclosure.
Figure 5:
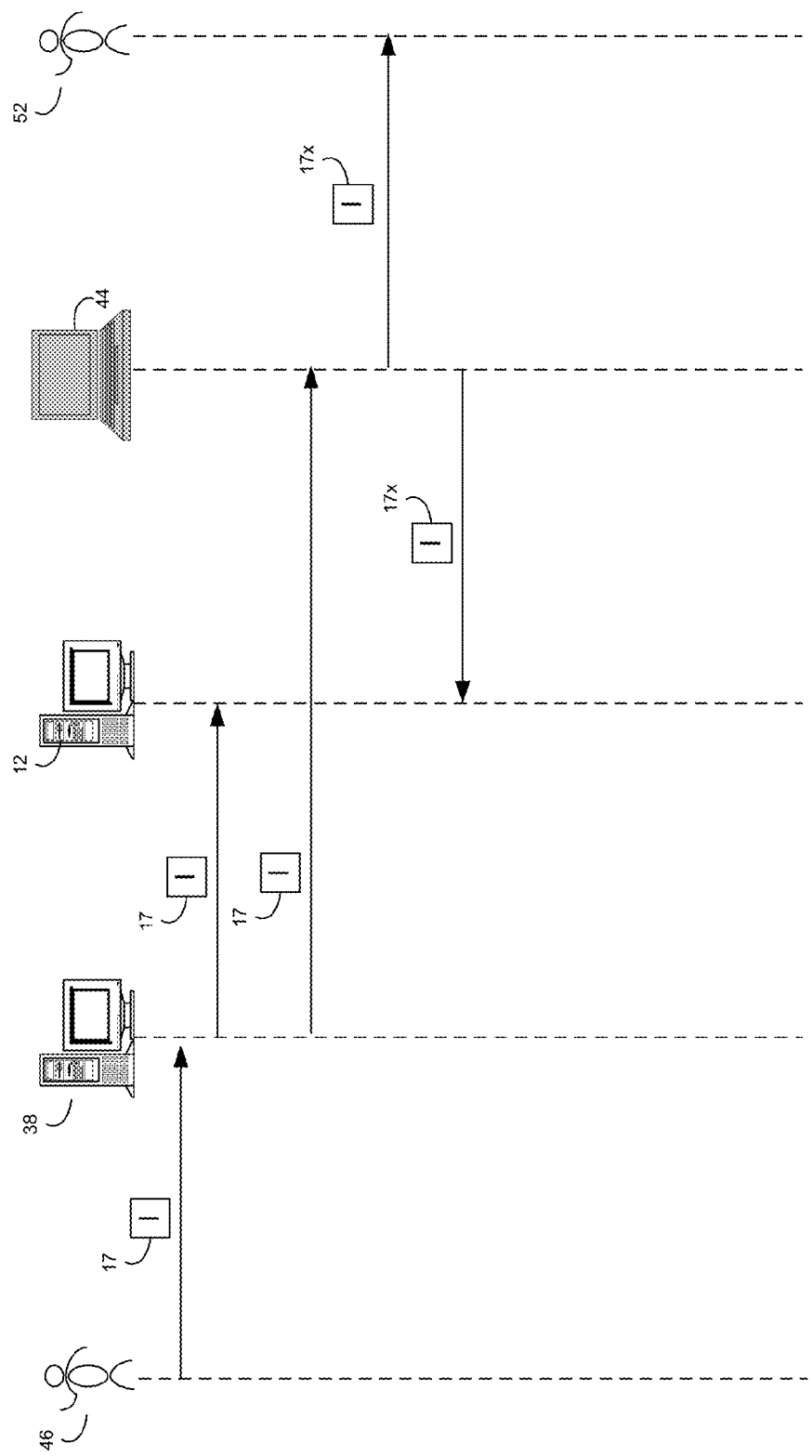
FIG. 5 is an illustrative flowchart for sending information according to one or more embodiments of the present disclosure.
Figure 6:
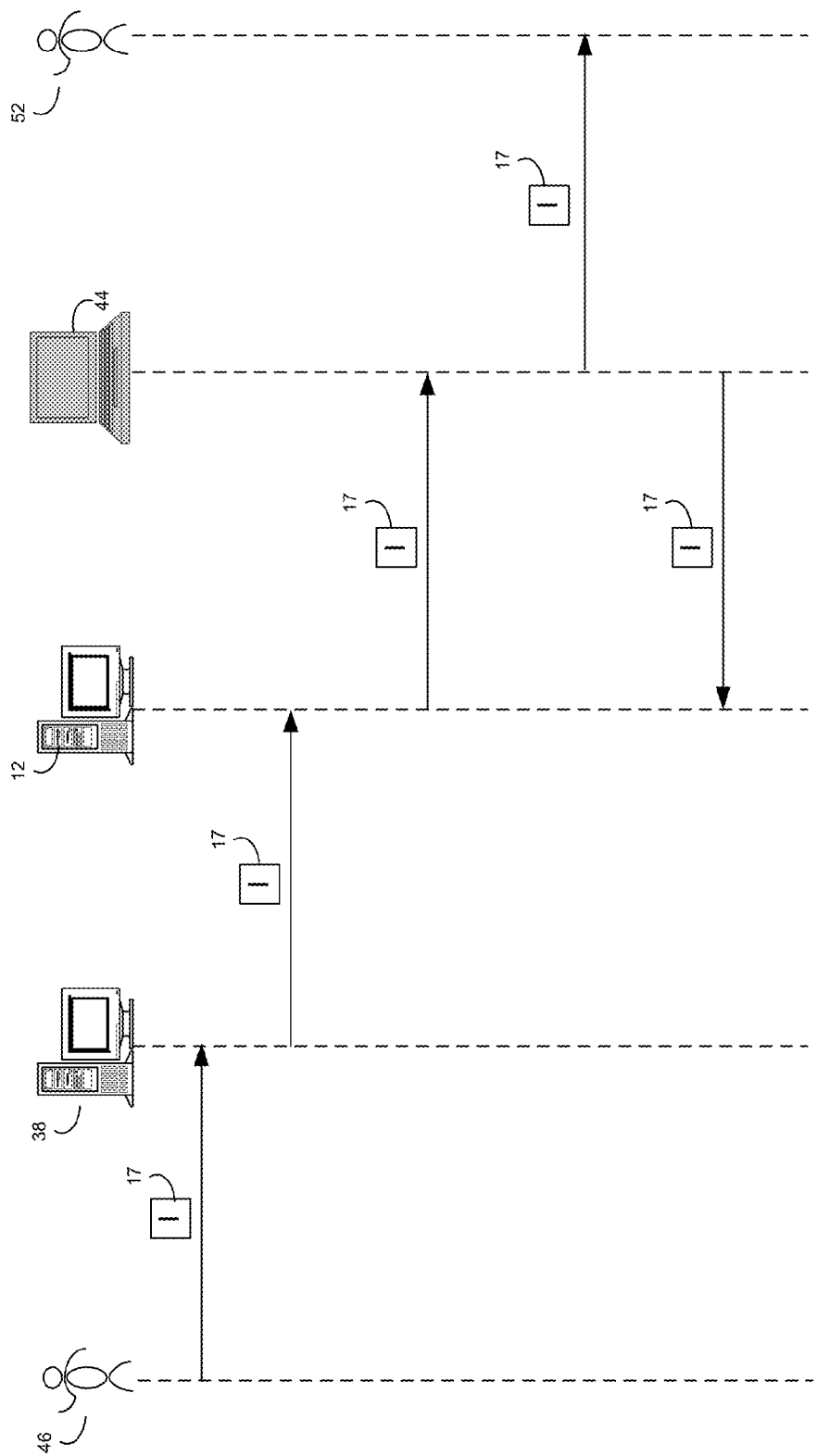
FIG. 6 is an illustrative flowchart for sending information according to one or more embodiments of the present disclosure.
Figure 7:
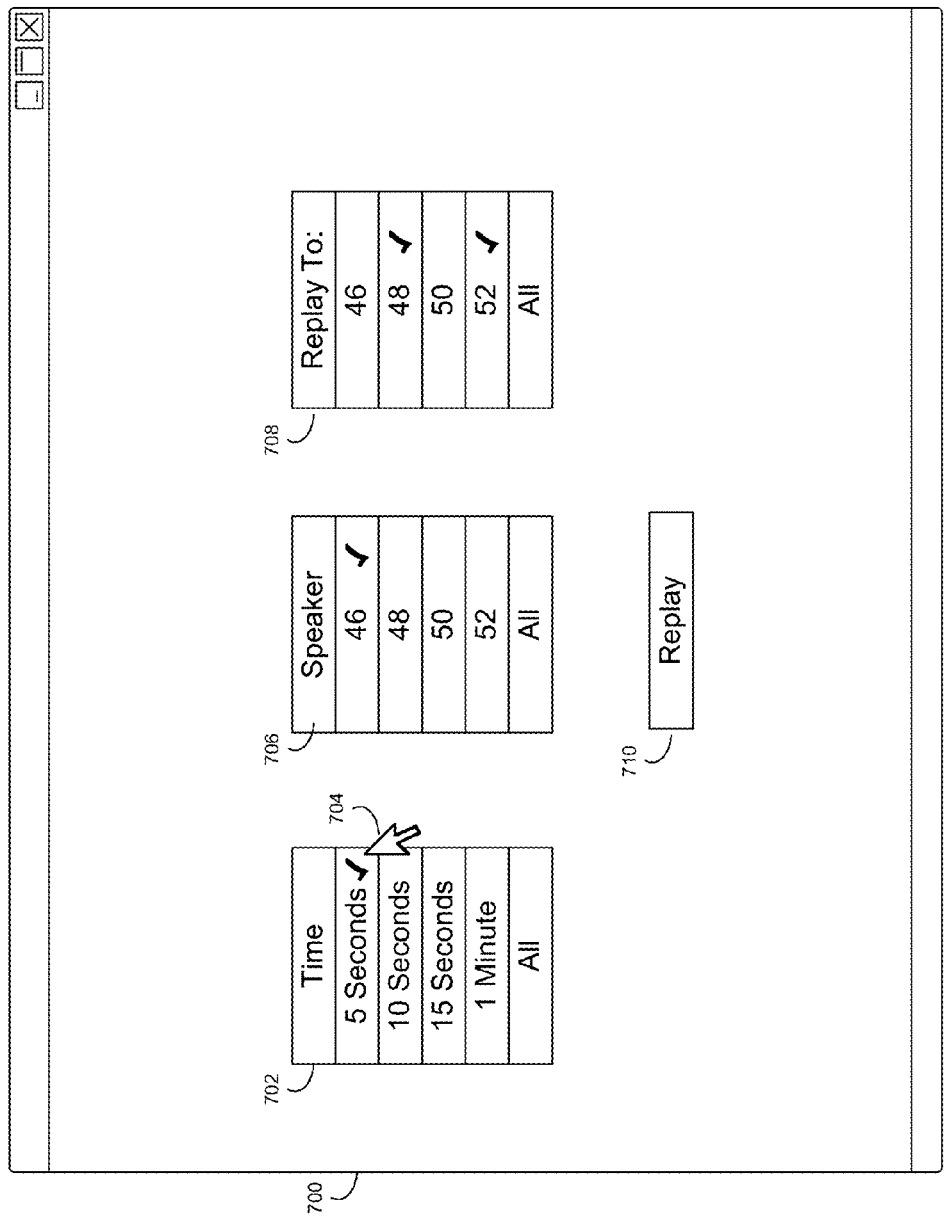
FIG. 7 is an illustrative diagrammatic view of a screen image displayed by the correction process of FIG. 1 according to one or more embodiments of the present disclosure.
Figure 8:
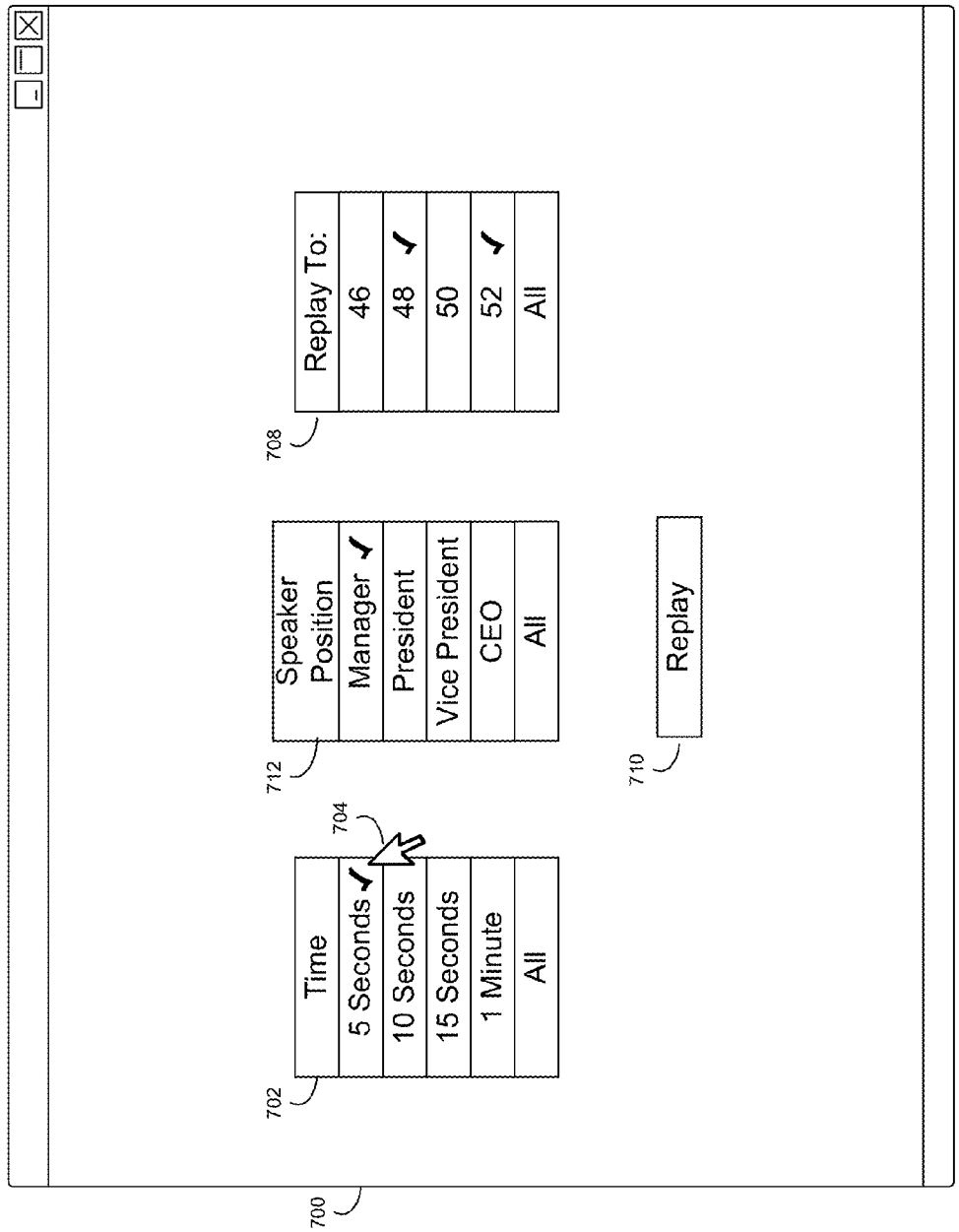
FIG. 8 is an illustrative diagrammatic view of a screen image displayed by the correction process of FIG. 1 according to one or more embodiments of the present disclosure.
Figure 9:
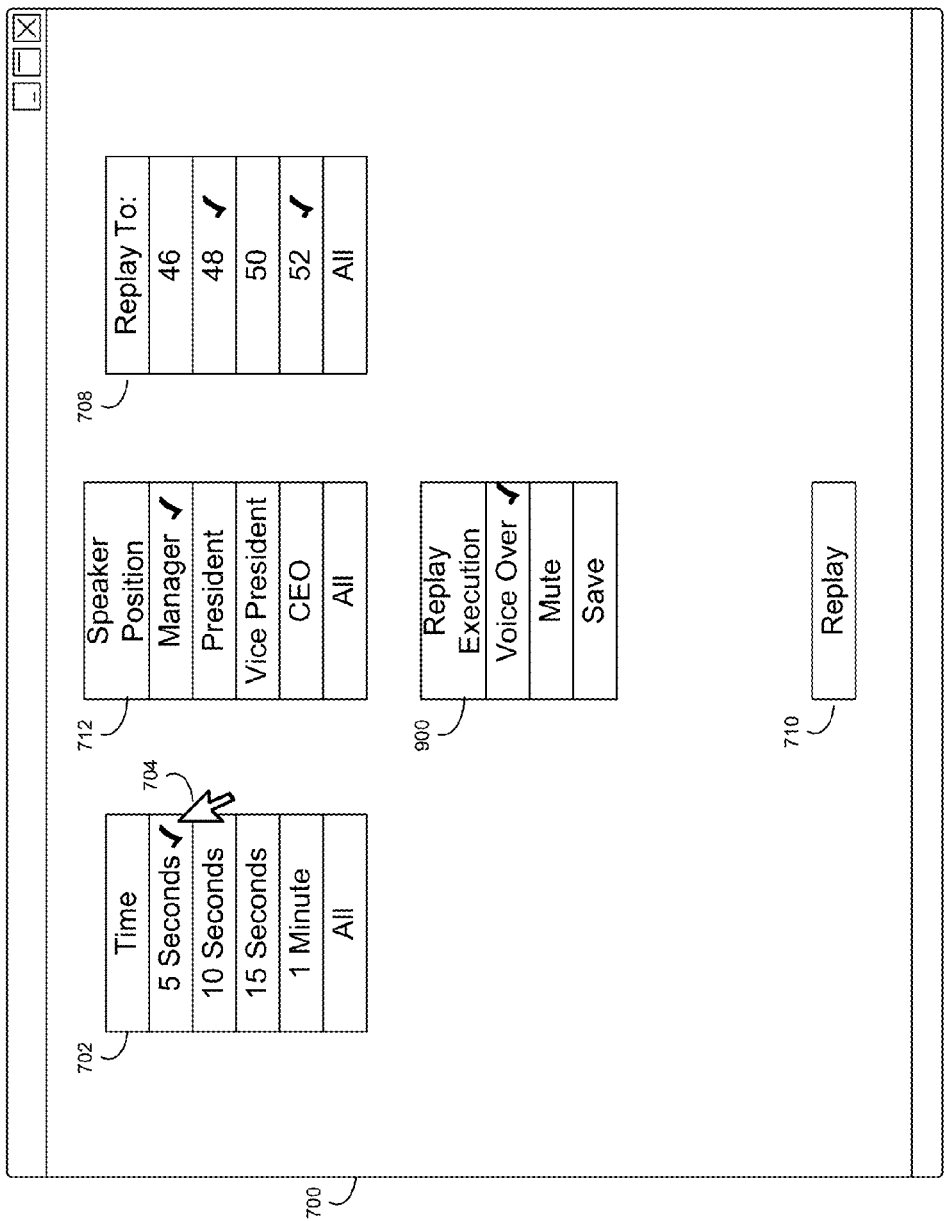
FIG. 9 is an illustrative diagrammatic view of a screen image displayed by the correction process of FIG. 1 according to one or more embodiments of the present disclosure.
Figure 10:
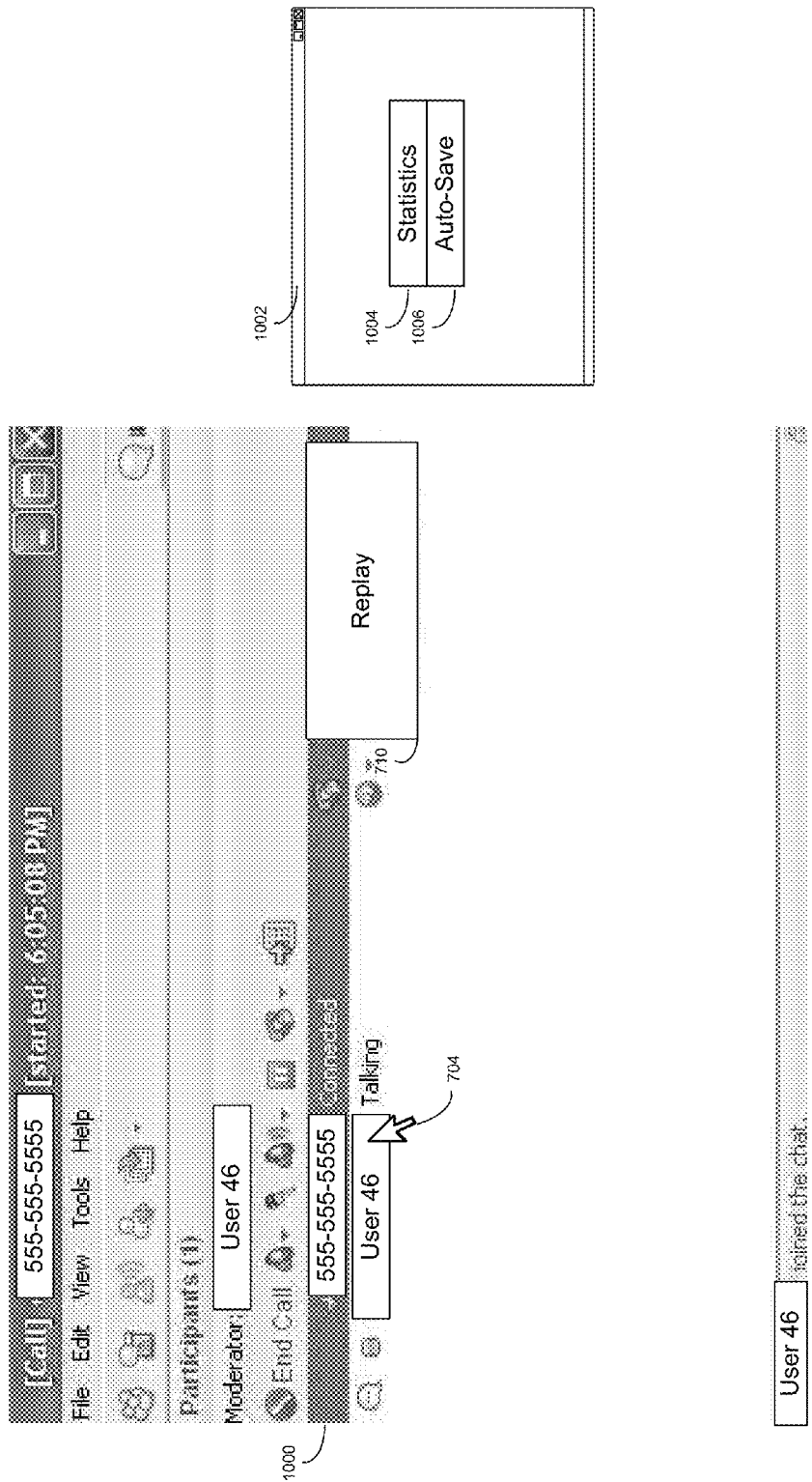
FIG. 10 is an illustrative diagrammatic view of a screen image displayed by the correction process of FIG. 1 according to one or more embodiments of the present disclosure.

Referring also to FIG. 2, there is shown a diagrammatic view of client computer 12. While client computer 12 is shown in this figure, this is for illustrative purposes only and is not intended to be a limitation of this disclosure, as other configuration are possible. For example, any computing device capable of executing, in whole or in part, correction process 10 may be substituted for client computer 12 within FIG. 2, examples of which may include but are not limited to client electronic devices 28, 30, 32, 34.

Client computer 12 may include a processor and/or microprocessor (e.g., microprocessor 200) configured to, e.g., process data and execute the above-noted code/instruction sets and subroutines of correction process 10. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Correction Process:

As discussed above and referring also to FIGS. 3-10, correction process 10 may receive 300 information from a first computing device. The information may include digital audio data that may be sent to, e.g., a second computing device from, e.g., the first computing device. The information may be received 302 from the second computing device. A discrepancy between at least a portion of the information sent by the first computing device and at least a portion of the information received from the second computing device may be identified 304 in real-time. At least a portion of the discrepancy may be corrected 306 in real-time for replaying at least the portion of the discrepancy at the second computing device.

As noted above, correction process 10 may receive 300 information (e.g., information 17) from a first computing device (e.g., client electronic device 38). Information 17 may include digital audio data that may be sent to a second computing device (e.g., client electronic device 44), e.g., by client electronic device 38. For instance, assume for example purposes only that using any combination of client application 22, client application 28, collaboration application 20, and correction process 10, a first user (e.g., user 46) is speaking or otherwise communicating via client electronic device 38 with a second user (e.g., user 52) via client electronic device 44. In the example, information 17 may contain at least some of the audio (e.g., digital audio data) captured from user 46 by, e.g., a microphone, of client electronic device 38. Further in the example, and referring at least to FIG. 4, correction process 10, e.g., via client computer 12, may receive 300 information 17 from client electronic device 38. Correction process 10 may subsequently send information 17 from client computer 12 to client electronic device 44 to be heard, e.g., through speakers (not shown), by user 52.

In some embodiments, correction process 10 may receive 302 information 17 from the second client electronic device 44. For instance, continuing with the above example, further assume a communications environment without any loss of quality such that information 17 sent from client electronic device 38 is identical to the information eventually received by client computer 12. In the example, the same information 17 then sent from client computer 12 and received by client electronic device 44 (e.g., and user 55) may then be sent back to, e.g., client computer 12, and received 302 via correction process 10.

In some embodiments, however, the communications environment may be such that somewhere there is some perceived loss or lack of quality of information 17 due to, e.g., latency, packet loss, noise, hardware and software quality issues. For example, and still referring at least to FIG. 4, information 17 may have no loss of quality when correction process 10 receives 300 information 17 via client computer 12. Further in the example, information 17 may incur some loss of quality at some point (e.g., before, during, or after) when correction process 10, e.g., via client computer 12, sends information 17 to client electronic device 44. In the example, information 17 with a loss of quality is illustratively labeled as information 17x. Continuing with the example, since information 17x is sent by correction process 10 via client computer 12 to client electronic device 44 (e.g., and user 55), then correction process 10 may receive 302 information 17x sent from client electronic device 44. In some embodiments, the loss of quality of information 17 may occur elsewhere (e.g., due to hardware and/or software issues on client electronic device 44 after client electronic device 44 has received information 17 from client computer 12).

In some embodiments, correction process 10, e.g., via client computer 12, client electronic device 38, and client electronic device 44, may gain connection information in a handshake that permits the sending and receiving of information 17. The handshake may be implemented at any time, or, e.g., when correction process 10, e.g., via client computer 12, client electronic device 38, and client electronic device 44 identify 304 a discrepancy in information 17 as discussed further below. Additionally/alternatively, the handshake may be implemented in response to user interaction (e.g., explicitly or manually requesting a correction for replay of information 17 as will be discussed further below).

While some embodiments are described with information 17 (or 17x) being sent by client electronic device 38, received 300 by client computer 12, and then sent from client computer 12 to client electronic device 44, those skilled in the art will appreciate that other implementations may exist. For example, and referring at least to FIG. 5, client electronic device 44 may receive information 17 (or 17x) sent by client electronic device 38 "directly" (e.g., bypassing client computer 12 and/or via one or more intermediary computing devices other than client computer 12). As such, the description of information 17 (or 17x) being sent by client electronic device 38, received 300 by client computer 12, and then sent from client computer 12 to client electronic device 44 should be taken as an example only and not to otherwise limit the scope of the disclosure.

In some embodiments, and referring again at least to FIG. 4, a discrepancy between at least a portion of information 17 received 300 from client electronic device 38 and at least a portion of information 17x received 302 from client electronic device 44 may be identified 304 by correction process 10 in real-time. For example, correction process 10 may dynamically identify 304 the discrepancy between information 17 received 300 from and/or sent by client electronic device 38 and information 17x received 302 from client electronic device 44 during the communication session with client electronic device 38 and client electronic device 44 where user 52 receives information 17x.

In some embodiments, correction process 10 may dynamically identify 304 the discrepancy between information 17 received 300 from and/or sent by client electronic device 38 and information 17x received 302 from client electronic device 44 by comparing 308 at least the portion of information 17 received 300 from and/or sent by client electronic device 38 with at least the portion of information 17x received 302 from client electronic device 44. For example, correction process 10 may, e.g., via client computer 12, compare 308 information 17 received 300 from and/or sent by client electronic device 38 with information 17x received 302 from client electronic device 44. Such a comparison may be accomplished leveraging, e.g., Perceptual Evaluation of Speech Quality (PESQ) standards. In some embodiments, if information 17 received 300 from and/or sent by client electronic device 38 is not identical with information 17x received 302 from client electronic device 44, correction process 10 may identify 304 the discrepancy between information 17 and information 17x.

Additionally/alternatively, the discrepancy need not be identified 304 by correction process 10 comparing 308 information 17 with information 17x. For instance, assume for example purposes only that there is no loss of quality of information 17 at any point between what is captured at client electronic device 38, received at client computer 12, and received at client electronic device 44. In the example, without a loss of quality of information 17, a comparison 308 of information 17 received 300 from and/or sent by client electronic device 38 with information 17 received 302 from client electronic device 44 may be identical. However, further assume that user 46 is new to the English language and has a thick foreign accent. The thick accent may make it difficult for user 52 to understand what is being said by user 46. Thus, in some embodiments, the communications environment may be such that the discrepancy may be due to some perceived loss or lack of quality of information 17 in user 52's comprehension of information 17, e.g., from the speakers of client electronic device 44 due to, e.g., user listening effort, user accents, and user expectations, rather than a discrepancy between information 17 being captured (e.g., originated) at client electronic device 38 and information 17 eventually being received by client electronic device 44 (e.g., via client computer 12). In some embodiments, correction process 10 may include well-known applications (e.g., transcription applications) that may indicate when information 17 may be difficult to understand (and therefore identify 304 a possible discrepancy in user comprehension) even if there is no loss of quality of information 17.

In some embodiments, correction process 10 may dynamically identify 310 the discrepancy (e.g., miscomprehension of information 17) based upon, at least in part, one or more received user options. For example, and continuing with the above example where the discrepancy is in user 52's comprehension of information 17, correction process 10 may render a window (e.g., window 700) via a user interface on, e.g., client electronic device 44. In some embodiments, window 700 may include selectable user options, such as, e.g., time 702, which may indicate, e.g., how much to correct 306 for replay, how many sentences to correct 306 for replay, etc. For instance, if a live conversation has been ongoing for, e.g., 30 seconds, and without any loss of quality in information 10, user 52 did not understand what was just said by user 46. In the example, user 52 may via curser 704 select time 702 (e.g., 5 seconds). As such, correction process 10 may receive the 5 second time selection, identify 310 the discrepancy based upon, at least in part, the received selection, and correct 306 for replay the most recent 5 second portion of the conversation (i.e., seconds 25-30).

In some embodiments, and continuing with the above example, window 700 may include selectable user options, such as, e.g., speaker 706, which may indicate which speaker user 52 wishes to correct 306 for replay. For instance, if a live conversation includes users 46, 48, 50, and 52, user 52 may via curser 704 select speaker 706 (e.g., user 46). As such, correction process 10 may receive the 5 second time selection, identify 310 the discrepancy based upon, at least in part, the received selection, receive the user 46 speaker selection, and correct 306 for replay, e.g., the most recent 5 seconds of conversation by user 46.

In some embodiments, and continuing with the above example, window 700 may include selectable user options, such as, e.g., replay to 708, which may indicate to which user that user 52 wishes to correct for replay the conversation. For instance, if a live conversation includes users 46, 48, 50, and 52, user 52 may via curser 704 select replay to 708 a sub-set of those participating in the conversation (e.g., user 48). As such, correction process 10 may receive the 5 seconds time selection, identify 310 the discrepancy based upon, at least in part, the receive selection, receive the user 46 speaker selection, receive the replay to user 48 and user 52 selection, and correct 306 for replay, e.g., the most recent 5 seconds of conversation by user 46 to user 48 and user 52.

In some embodiments, time 702, speaker 706, and replay to 708 may be pre-selected by user 52 and/or correction process 10 as a default selection, such that correction process 10 may receive a selection of replay 710 to correct 306 for replay the appropriate sections of the conversation of information 17 without user 52 individually selecting time 702, speaker 706, and replay to 708. Additionally/alternatively, correction process 10 may make selecting time 702, speaker 706, and replay to 708 unavailable until a discrepancy is identified 304. Those skilled in the art will appreciate that other selectable user options, such as organizational positions (e.g., position 712) may also be used. For instance, continuing with the above example, correction process 10 may receive the 5 seconds time selection, identify 310 the discrepancy based upon, at least in part, the receive selection, receive the manager speaker selection, receive the replay to user 48 and user 52 selection, and correct 306 for replay, e.g., the most recent 5 seconds of conversation by the manager to user 48 and user 52.

In some embodiments, correction process 10 may dynamically identify 310 the discrepancy (e.g., loss of quality of information 17) based upon, at least in part, one or more of the above-noted received user options. In some embodiments, window 700 may be rendered before the discrepancy is identified 304 (e.g., when client application 28 is executed), or may be rendered when the discrepancy is identified 304 (e.g., via a pop-up window as window 700) as a notification to user 52.

At least a portion of the discrepancy may be corrected 306 by correction process 10 in real-time for replaying at least the portion of the discrepancy at client electronic device 44. For instance, assume for example purposes only that information 17 should have been received by user 52; however, due to a loss of quality of information 17, information 17x was received instead. In the example, correction process 10 may correct 306 information 17x such that the information as intended (i.e., as information 17) is able to be replayed, e.g., via correction process 10, at client electronic device 44.

In some embodiments, correcting 306 in real-time at least the portion of the discrepancy may include correction process 10 sending 312, to client electronic device 44, a replayable file that includes at least the portion of the discrepancy. For instance, continue with the above example where information 17 should have been received by user 52; however, due to a loss of quality of information 17, information 17x was received instead. In the example, correction process 10 may send 312 to client electronic device 44 a replayable file that contains at least the portion of information 17 that has been identified 304 as containing the discrepancy. The replayable file may be sent by, e.g., client electronic device 38 and/or client computer 12. In some embodiments, the replayable file may be sent from another client electronic device that may have received information 17 without the loss of quality of information 17, and which is more "network-proximate" to client electronic device 44 than client computer 12 and/or client electronic device 38. In the embodiment, correction process 10 may automatically detect one or more client electronic devices and their network-proximity to client electronic device 44 and select the best choice (e.g., best path) for which client electronic device would provide the replayable file to client electronic device 44 in the fastest time. Once received, correction process 10 via client electronic device 44 may correct 306 for replay the file.

In some embodiments, correcting 306 in real-time at least the portion of the discrepancy may include correcting 314 in real-time at least the portion of the discrepancy based upon, at least in part, one or more received user options. For example, in some embodiments, window 700 may include selectable user options, such as, e.g., replay execution 900, which may indicate how information is to be corrected 306 for replay. For instance, user 52 may via curser 704 select replay execution 900 (e.g., voice over). As such, correction process 10 may receive the voice over selection and correct 306 for replay at client electronic device 44 at least the portion of information 17 containing the discrepancy at a lower volume simultaneously to the ongoing conversation.

In some embodiments, user 52 may via curser 704 select replay execution 900 (e.g., mute). As such, correction process 10 may receive the mute selection and correct 306 for replay at client electronic device 44 at least the portion of information 17 containing the discrepancy while muting the ongoing conversation. In some embodiments, the muted portion of the ongoing conversation may then be identified 304 by correction process 10 as having a discrepancy.

In some embodiments, user 52 may via curser 704 select replay execution 900 (e.g., save). As such, correction process 10 may receive the save selection and save any portion of the conversation (e.g., locally or remotely) and then correct 306 for replay at client electronic device 44 the saved portion at a later time (e.g., after the conversation ends).

In some embodiments, correction process 10 may determine 316 that at least the portion of information 17 from a user is received at client electronic device 44. For example, correction process 10 may determine 316 that information 17 (or 17x) contains the voice information from user 46, since user 46 may have been speaking. In the example, correction process 10 may display 318 the identification of user 46 and a time (e.g., during the conversation, local time, etc.) when the voice information is received from user 46 in response to the determination 316. For instance, correction process 10 may render a window (e.g., window 1000). Window 1000 may render an identification that user 46 is talking.

Correcting 306 by process 10 in real-time at least the portion of the discrepancy may include receiving 320 a selection of the displayed identification of the user. For example, user 52 may via curser 704 select user 46 from window 1000. As such, correction process 10 may receive 320 the user 46 selection and correct 306 for replay at client electronic device 44 at least a portion of information 17 as discussed above.

In some embodiments, receiving 320 the selection of user 46 from window 1000 may cause correction process 10 to render another window (e.g., pop-up window 1002), which may provide other user options. For example, user 52 may via curser 704 select statistics 1004. Correction process 10 may receive the selection of statistics 1004 and provide statistics to user 52 (e.g., via another pop-up window, email, etc.) pertaining to such things as, e.g., how many times a call was placed to/from user 52 and user 46 respectively, and how many times a specific word was used. Other selectable user options (not shown) may include, e.g., storing information 17 (or 17x) locally and/or remotely depending on who is participating in the call, who is speaking at a particular moment, and/or the time of the call, default settings of transcript of information 17 to text or voice data (e.g., which may be used with instant messaging, email, write-to-file, etc.), where to save any transcripts of information 17 (e.g., a central computer such as client computer 12 rather than client electronic devices 38 and 44), limitations on how much of information 17 may be stored on client computer 12 and/or client electronic devices 38 and 44 (e.g., based on the size of the conversation and/or number of conversations), which policies to set for client electronic devices 38 and 44, and report statistics (e.g., what is being saved and by whom).

In some embodiments, user 52 may via curser 704 select auto-save 1006. Correction process 10 may receive the selection of auto-save 1006 and permit (e.g., via a drop down menu (not shown) or another window (not shown)) user 52 to automatically save certain portions of information 17 (e.g., via client computer 12 and/or client electronic device 44) based upon, e.g., the subject of the conversation, the users involved, etc.).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   receiving information from a first computing device via a network, the information including digital audio data, the information sent to a second computing device by the first computing device;
   receiving second information from the second computing device via the network, the second information including the information received by the second computing device from the first computing device;
   identifying in real-time a discrepancy between at least a portion of the information sent by the first computing device and at least a portion of the second information received from the second computing device;
   correcting in real-time at least a portion of the discrepancy for replaying, at the second computing device, at least the portion of the discrepancy; and
   replaying, at the second computing device, at least the portion of the discrepancy.

2. The computer-implemented method of claim 1 wherein identifying in real-time the discrepancy includes comparing at least the portion of the information sent by the first computing device with at least the portion of the second information received from the second computing device.

3. The computer-implemented method of claim 1 wherein correcting in real-time at least the portion of the discrepancy includes sending, to the second computing device, a replayable file that includes at least the portion of the discrepancy.

4. The computer-implemented method of claim 1 wherein identifying in real-time the discrepancy includes identifying in real-time the discrepancy based upon, at least in part, one or more received user options.

5. The computer-implemented method of claim 1 wherein correcting in real-time at least the portion of the discrepancy includes correcting in real-time at least the portion of the discrepancy based upon, at least in part, one or more received user options.

6. The computer-implemented method of claim 1 further comprising:
   determining that at least the portion of the information from a user is received at the second computing device; and
   displaying an identification of the user and a time when at least the portion of the information is received from the user in response to the determination.

7. The computer-implemented method of claim 6 wherein correcting in real-time at least the portion of the discrepancy includes receiving a selection of the displayed identification of the user.

8. A computer program product residing on a non-transitory computer readable storage medium having a plurality of instructions stored thereon which, when executed by a processor, cause the processor to perform operations comprising:
   receiving information from a first computing device via a network, the information including digital audio data, the information sent to a second computing device by the first computing device;
   receiving second information from the second computing device via the network, the second information including the information received by the second computing device from the first computing device;
   identifying in real-time a discrepancy between at least a portion of the information sent by the first computing device and at least a portion of the second information received from the second computing device;
   correcting in real-time at least a portion of the discrepancy for replaying, at the second computing device, at least the portion of the discrepancy; and
   replaying, at the second computing device, at least the portion of the discrepancy.

9. The computer program product of claim 8 wherein identifying in real-time the discrepancy includes comparing at least the portion of the information sent by the first computing device with at least the portion of the second information received from the second computing device.

10. The computer program product of claim 8 wherein correcting in real-time at least the portion of the discrepancy includes sending, to the second computing device, a replayable file that includes at least the portion of the discrepancy.

11. The computer program product of claim 8 wherein identifying in real-time the discrepancy includes identifying in real-time the discrepancy based upon, at least in part, one or more received user options.

12. The computer program product of claim 8 wherein correcting in real-time at least the portion of the discrepancy includes correcting in real-time at least the portion of the discrepancy based upon, at least in part, one or more received user options.

13. The computer program product of claim 8 wherein the operations further comprise:
   determining that at least the portion of the information from a user is received at the second computing device; and
   displaying an identification of the user and a time when at least the portion of the information is received from the user in response to the determination.

14. The computer program product of claim 13 wherein correcting in real-time at least the portion of the discrepancy includes receiving a selection of the displayed identification of the user.

15. A computing system including a processor and memory configured to perform operations comprising:
   receiving information from a first computing device via a network, the information including digital audio data, the information sent to a second computing device by the first computing device;

receiving second information from the second computing device via the network, the second information including the information received by the second computing device from the first computing device;

identifying in real-time a discrepancy between at least a portion of the information sent by the first computing device and at least a portion of the second information received from the second computing device;

correcting in real-time at least a portion of the discrepancy for replaying, at the second computing device, at least the portion of the discrepancy; and replaying, at the second computing device, at least the portion of the discrepancy.

16. The computing system of claim 15 wherein identifying in real-time the discrepancy includes comparing at least the portion of the information sent by the first computing device with at least the portion of the second information received from the second computing device.

17. The computing system of claim 15 wherein correcting in real-time at least the portion of the discrepancy includes sending, to the second computing device, a replayable file that includes at least the portion of the discrepancy.

18. The computing system of claim 15 wherein identifying in real-time the discrepancy includes identifying in real-time the discrepancy based upon, at least in part, one or more received user options.

19. The computing system of claim 15 wherein correcting in real-time at least the portion of the discrepancy includes correcting in real-time at least the portion of the discrepancy based upon, at least in part, one or more received user options.

20. The computing system of claim 15 wherein the operations further comprise:

determining that at least the portion of the information from a user is received at the second computing device; and displaying an identification of the user and a time when at least the portion of the information is received from the user in response to the determination.

21. The computing system of claim 20 wherein correcting in real-time at least the portion of the discrepancy includes receiving a selection of the displayed identification of the user.

* * * * *